No. 791,287. PATENTED MAY 30, 1905.
J. L. PERKINS.
DRILLING AND NAILING MACHINE.
APPLICATION FILED NOV. 14, 1903.

6 SHEETS—SHEET 5.

WITNESSES
John J. Kidde
Henry J. Sabatier

INVENTOR
Julian L. Perkins
BY
Gower Niles
ATTORNEYS

No. 791,287. PATENTED MAY 30, 1905.
J. L. PERKINS.
DRILLING AND NAILING MACHINE.
APPLICATION FILED NOV. 14, 1903.
6 SHEETS—SHEET 6.
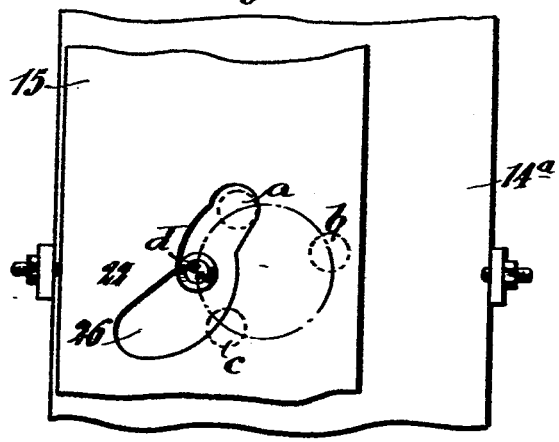
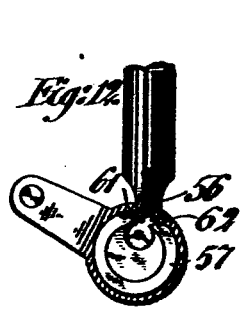
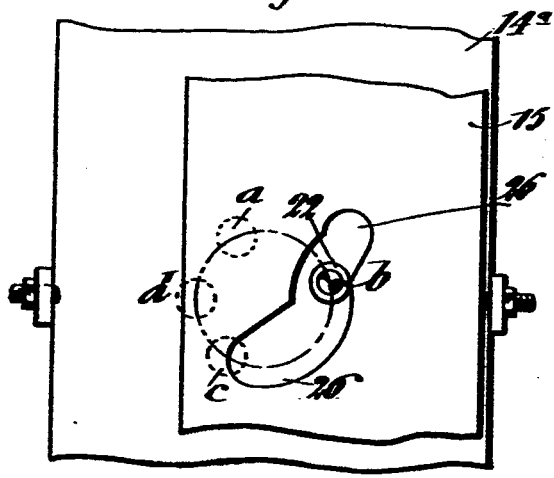
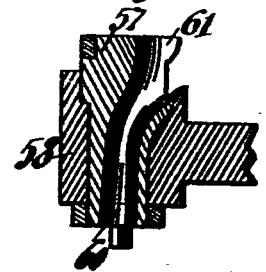
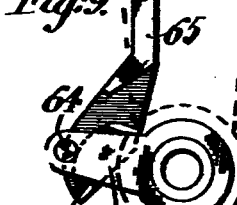
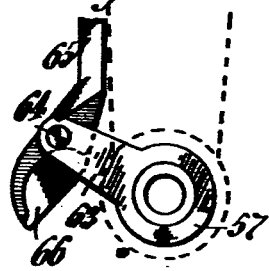
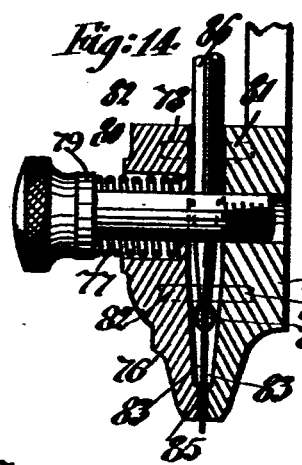
Witnesses
John J. Kittle
Henry J. Suberbier
Inventor
Julian L. Perkins
By his Attorneys
Grade Niles No. 791,287.  Patented May 30, 1905.

UNITED STATES PATENT OFFICE.

JULIAN L. PERKINS, OF WEST SPRINGFIELD, MASSACHUSETTS.

DRILLING AND NAILING MACHINE.

SPECIFICATION forming part of Letters Patent No. 791,287, dated May 30, 1905.

Application filed November 14, 1903. Serial No. 131,214.

*To all whom it may concern:*

Be it known that I, JULIAN L. PERKINS, a citizen of the United States, residing in West Springfield, in the county of Hampden and State of Massachusetts, have invented certain new and useful Improvements in Drilling and Nailing Machines, of which the following is a specification.

This invention relates to a machine for drilling and nailing copper, zinc-etchings, and electrotype-plates to wooden blocks or metal bases. In the machines heretofore in use the nail is driven through the copper, zinc, or electrotype plate. This causes the surface adjacent to the nail to be slightly deflected. When great care is not exercised in driving the nail, it will cause depressed places to be formed in the cut, thereby spoiling the plate. The object of my machine is to overcome this defect by first drilling the hole through the plate and then driving the nail through the hole into the wooden or metal block or blocks; and for this purpose the invention consists of a combined drilling and nailing machine for use in newspaper and other printing offices, which will be fully described hereinafter and finally pointed out in the claims.

Figure 1:
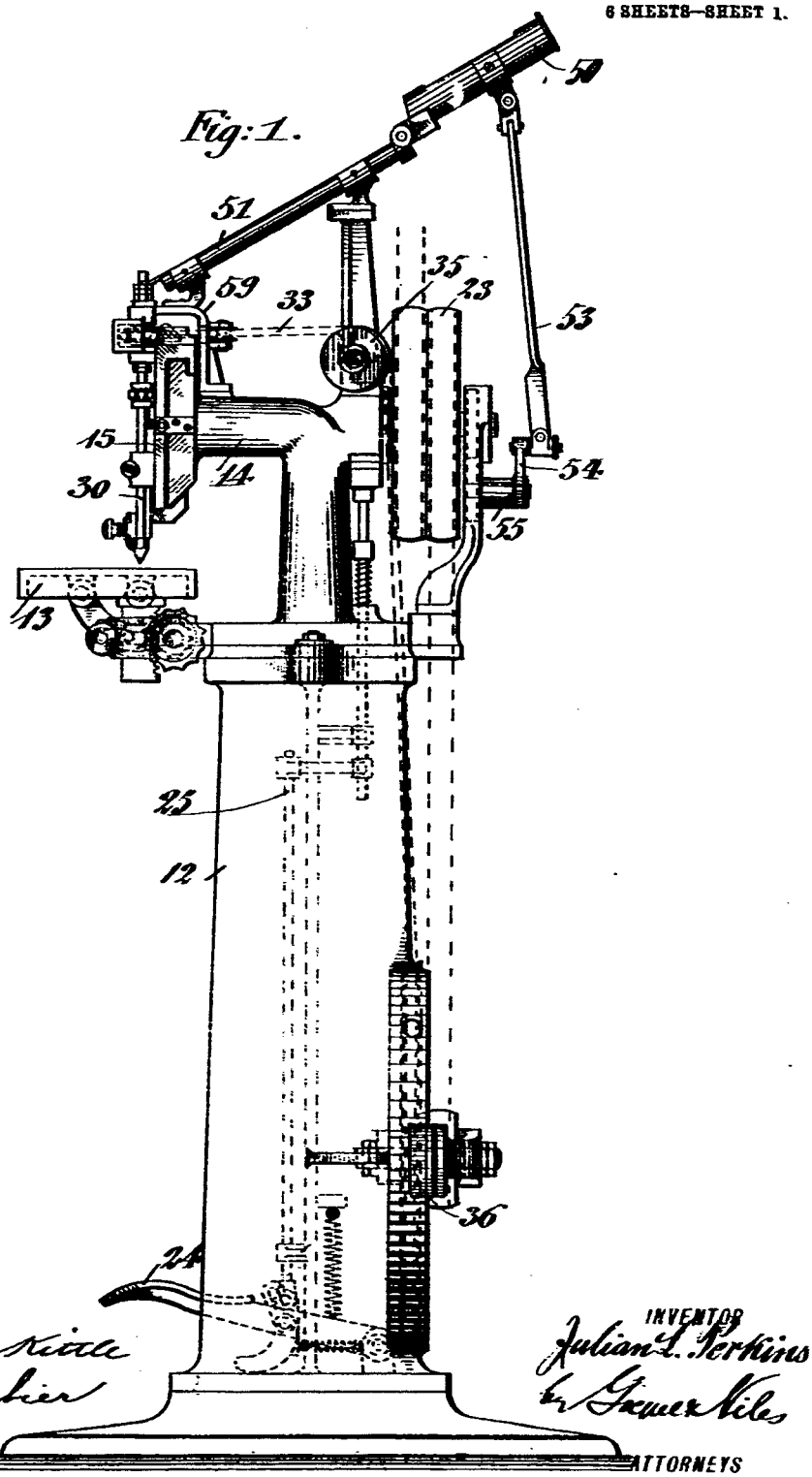
Figure 2:
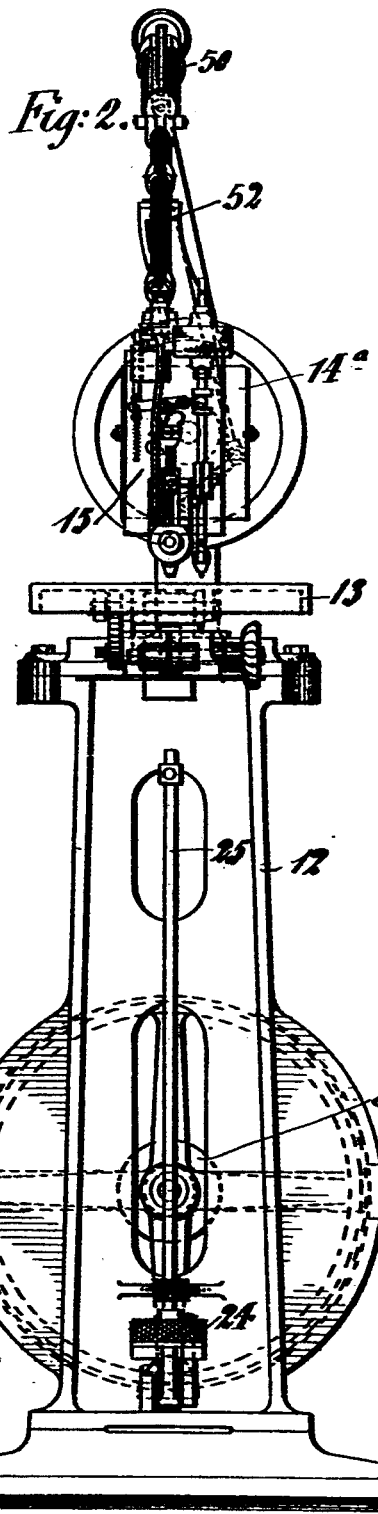
Figure 3:
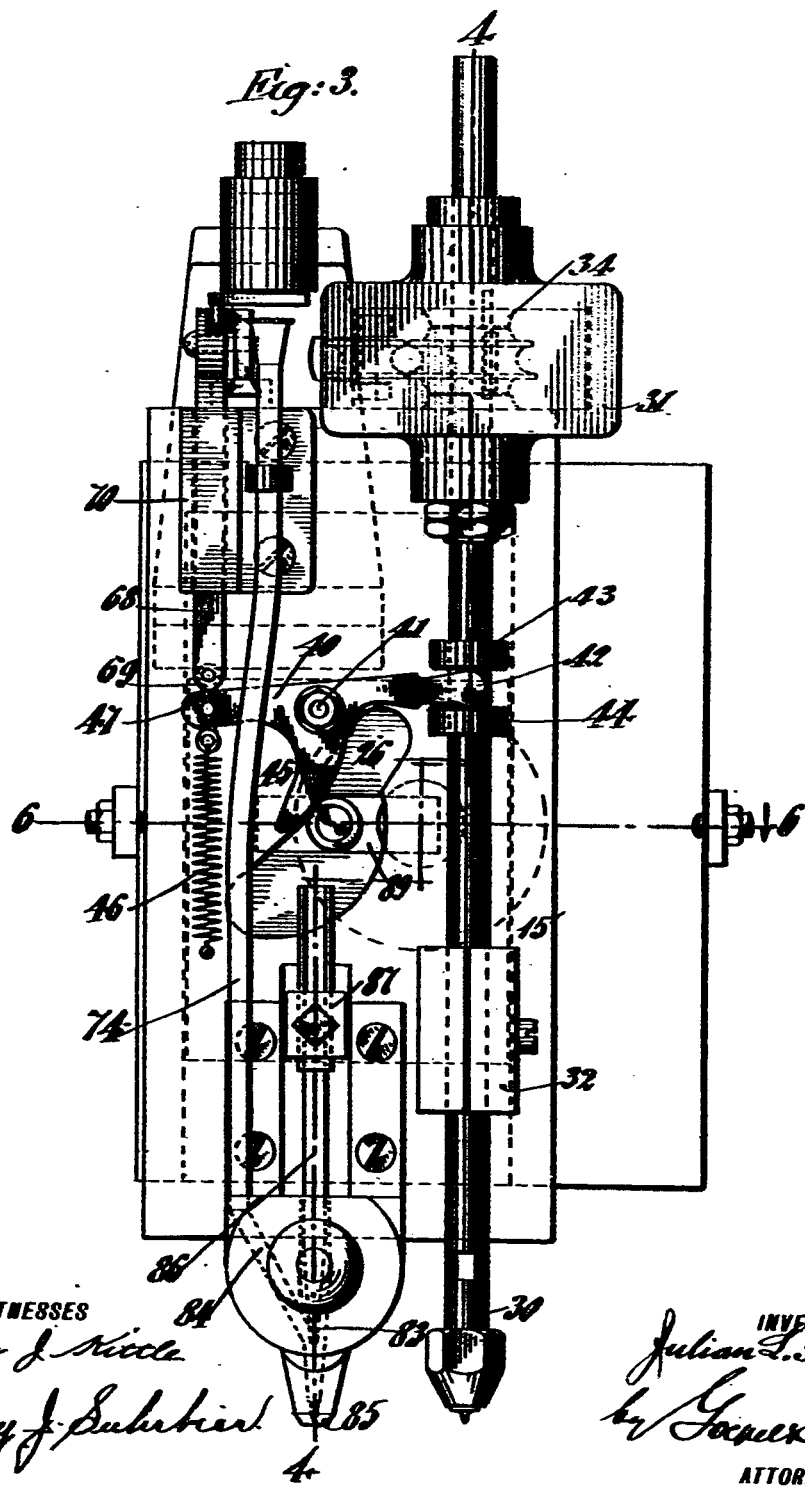
Figure 4:
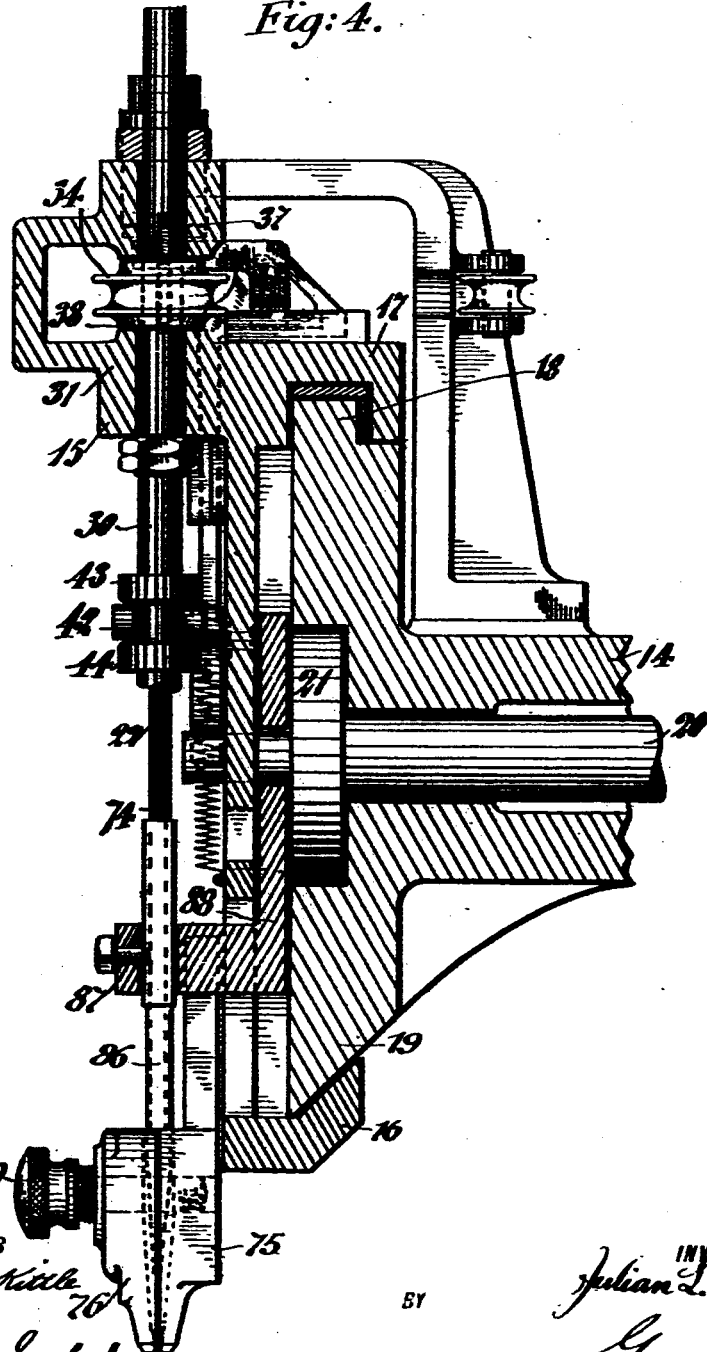
Figure 5:
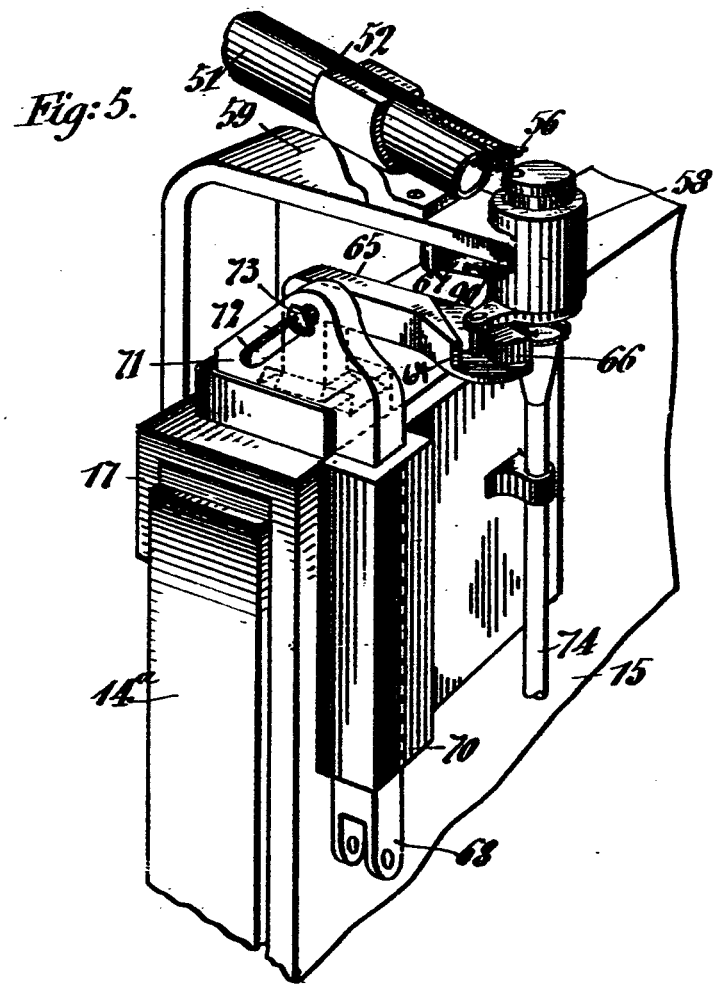
Figure 6:
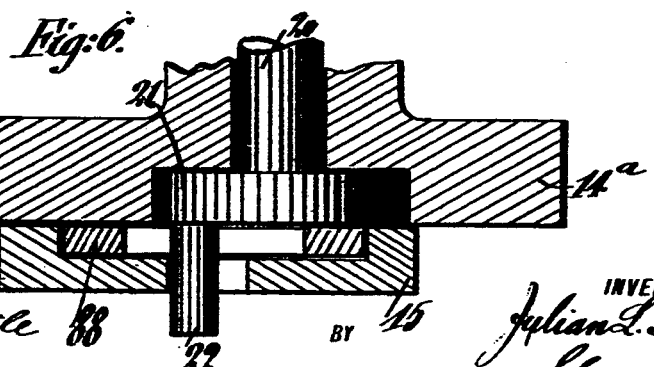

In the accompanying drawings, Figure 1 is a side elevation of my improved drilling and nailing machine. Fig. 2 shows the machine in front elevation. Fig. 3 shows a similar view of the upper portion of the machine drawn on a larger scale. Fig. 4 is a vertical section on line 4 4, Fig. 3. Fig. 5 shows in perspective a portion of the nail-feeding device. Fig. 6 is a horizontal section on line 6 6, Fig. 3. Figs. 7 and 8 are diagrams showing the relative successive positions of the crank-pin and movable carrier. Figs. 9 and 10 are details showing the return positions of the nail-feed-operating cam. Figs. 11 and 12 show the nail-feed tube and separating-cam in two positions. Fig. 13 shows the separating-cam block in section, and Fig. 14 is a sectional view of the nail-holding block.

Similar letters and numerals of reference indicate corresponding parts.

Referring now to the drawings, 12 is a stand of any preferred form, having a table 13 mounted thereon and a supporting-standard 14 at the top of the stand. On the overhanging end of the standard 14 slides a carrier consisting of a plate 15, with flanged portions 16 and 17 that overhang the upper and lower edges 18 and 19 of the standard, thereby permitting the carrier to slide horizontally on the standard.

The standard 14 has journaled therein a horizontal main shaft 20, having at its outer end a crank-disk 21, carrying a crank-pin 22, as best shown in Figs. 4 and 6. The shaft 20 is rotated intermittently by any suitable means, preferably from a double driving-pulley 23, that is constantly driven and from which motion is transmitted to the shaft 20 by a clutch arrangement controlled from the foot-lever 24 through the medium of the connecting-rod 25 in any of the well-known ways.

The slidable carrier-plate 15 is reciprocated from the crank-disk 21 by the crank-pin 22 engaging the walls of an irregular slot 26 in the plate 15. This slot is of a vertical length equal to the throw of the crank-pin. Hence one revolution of the shaft 20 will cause one complete reciprocation of the carrier 15 and by an irregular motion that will be described hereinafter.

The carrier-plate 15 has supported thereon a drill-spindle 30, rotatable in a journal 31 at the upper part of the carrier and in a journal 32 at the lower portion of the carrier. The drill-spindle is rotated by a belt 33 engaging its pulley 34, which belt passes around guide-pulleys 35 and thence down and engages a pulley 36 on the stand 12. The pulley 36 may be driven from a part of the main pulley 23 by suitable belt. From Fig. 1 it will be observed that the carrier may be reciprocated within certain limits without disturbing the action of the belt 33 on the pulley 34—that is, the spindle 30 will be continually rotated in the several positions of the carrier. The pulley 34 is not rigidly secured to the spindle 30, but is connected therewith by a spline 37 on the pulley engaging a groove 38 in the spindle 30, thereby permitting the spindle to be vertically reciprocated while rotating.

The spindle 30 is actuated or vertically reciprocated by a double bell-crank 40, pivoted on a pin 41. The arm 42 of the bell-crank extends between fixed collars 43 and 44 on the spindle 30, while the arm 45 of the bell-crank is retained in the path of movement of the crank-pin 22 by a spring 46, secured to the carrier-plate and to the third arm 47 of the bell-crank. Thus it will be seen that the crank-pin will strike the arm 45 and rock the bell-crank, and thus reciprocate the drill-spindle 30.

The nails are placed in any quantity in a box 50, pivoted at its lower end to a guide-tube 51, the latter having a longitudinal slot 52 at the top, while the box 50, preferably tubular, has a slot in its bottom portion in alinement with the slotted portion of the tube 51. The box 50 is oscillated by a link 53, connecting the box with a crank 54, the latter rotating on a short shaft 55, that is rotated by suitable gears from the main shaft 20. When the nails reach the lower end of the tube 51, they are received by a forked extension 56 of the tube 51, that is arranged horizontally. The end nail is engaged by the side face of a tubular separating block 57, that oscillates in a journal-box 58, carried by a bracket 59, the latter being secured to the standard 14. The block 57 has a bore 60 leading to a hook portion 61 at the top, by which when the block is oscillated the end nail will be fed into and engaged by the opening inside the hook, and thus carried down through the bore 60 of the block.

From Figs. 5 and 11, which show the nail-block 57 in its normal position, it will be observed that the end nail is resting against an abutment-face 62 of the block 57, which in conjunction with the sides of the extension 56 prevent the nail from further advancing and the other nails from feeding downward; but upon the block 57 being slightly oscillated clockwise it will be seen from Fig. 12 that the hook 61 will pass between the said end nail and the adjacent nail just below the extension or strip 56, thereby advancing the end nail, while the same motion will move the abutment-face 62 away from its former position, thereby permitting the nail to enter the bore 60 of the block and fall therethrough by gravity. It will be seen, further, that the next nail in the strip 56 is prevented from advancing by engaging the outer face of the hook 61, and upon the block being rocked back to its former position as soon as this succeeding nail is released from the said outer face of the hook it will advance but a short distance until it strikes the said abutment-face 62, which will arrest this nail and also the succeeding ones until the next oscillation of the block. Thus at each complete oscillation back and forth of the block one nail will be selected and fed into and through the bore of the block. In order to oscillate the said block 57 at the proper time in the revolution of the crank-disk 21, I provide an arm 63, secured to the lower portion of the block 57, which arm carries a pin 64. A bar 65 is supported on the upper overhanging part 17 of the carrier-plate and has a cam-lug 66 arranged to strike the said pin 64 upon the carrier-plate being reciprocated, and thereby rock the block 57 from its normal position, as shown in Fig. 11, in which position it is yieldingly retained by a plate-spring 67, secured to the bracket 59, and engaging a pin 90, that projects through a slot in the journal-box 58. This bar 65 is so disposed on the carrier that its cam will engage said pin 64 at the latter part of the movement of the carrier to the left, for a purpose hereinafter set forth; but means are also provided whereby the bar 65 is given an endwise movement, thereby to amplify the movement of the block 57 by the cam. To this end the lower bent portion of the bar 65 is dovetailed, which portion slidably engages a correspondingly-shaped channel in the top 17 of the carrier-plate. A bar 68 is connected with the arm 47 of the bell-crank by a link 69 and is guided for endwise movement in a box 70 on the plate 15. An irregular extension 71 of the bar 68 has a diagonal slot 72 therein, whose walls engage a bolt 73, secured to the said bar 65. Thus it will be seen that the rocking of the bell-crank 40 will through the bar 68 and the bolt 73 cause a reciprocation horizontally of the bar 65, and thereby oscillate the block 57 when its pin 64 is within operative position with relation to the cam 66. It may be here stated that the bar 68 may be dispensed with and the bar 65 rigidly secured on the plate 17 by so designing and arranging the cam 66 with relation to the block 57 and its operating-pin that the movement of the carrier will produce sufficient oscillation of the block 57.

On the carrier-plate 15 is secured a guide-tube 74, whose upper flaring end is opposite the bore in the block 57 when the carrier is at the limit of its left-hand position, and it is at this stage of the operation that the nail-feeding device above described is operated to feed a nail through the bore in the block. The nail passes downward through the guide-tube 74 and is received by a holder comprising two blocks 75 and 76, that are normally retained in engagement by means of a spring 77, that is interposed between an inner annular flange 78 on the block 76 and a nut 79, turning on a screw-bolt 80, secured to the block 75. Guide-pins 81, secured to the block 75, slide in sockets 82 in the block 76, thereby producing a proper movement of the blocks when separated. The opposing faces of the blocks each contain a groove 83, extending vertically the length of the block, and an inclined groove 84, leading into the groove 83, the said grooves registering in the blocks, thereby providing a bore for the reception of the nail from the tube 74. The lower end portion of the channel 83 in the block is constricted or tapering, as shown at 85, that the head of the nail will be engaged at this part and arrested in its passage through the block until by suitable means the blocks are separated against the force of said spring 80, thereby so enlarging the bore that the nail may pass out. The nail that is retained in the said block is forced out of the same and into the aperture made by the said drill at the proper stage in the operation of the complete device by a reciprocating hammer or driver. The latter consists of a rod 86, secured in a bore in an arm 87, projecting forward from a reciprocating plate 88, that slides in a channel in the rear face of the carrier-plate 15, which plate is reciprocated by reason of the crank-pin 22 engaging the walls of a slot 89 in the plate. The lower end of the nail-driving rod 86 is made converging and of a size to engage the converging bore of the block at the proper time when its lower end shall have reached the head of a nail retained at said portion of the block. Thereupon the further downward movement of the driver will separate the movable members of the block, permitting the nail to pass downward, and at the same time the driver will follow the nail and force it into a drilled block on the support of the machine.

The operation of the several parts above described is as follows: With the crank-disk at rest and the crank-pin to the right, as shown in Fig. 3, it will be seen that the nail-driver is in an intermediate position and that it will be raised upon the crank-pin moving upward to the limit of its movement and will be depressed upon the crank-pin moving downward from said position to its lowermost position. Now suppose the crank-disk to be moved clockwise through ninety degrees, bringing the pin to its uppermost position. It will be evident from Fig. 3 that the nail-driver will move upward, while the bell-crank will be oscillated once by the engagement of the crank-pin with the arm 45. During this movement of the crank-pin it will be seen from Fig. 7 that the portion of the irregular slot 26 through which the pin moves is substantially concentric with the crank-disk. Hence the crank-pin will strike no abutment-face that would cause the carrier to be moved—that is, the carrier is stationary with respect to a block on the work-support. This rocking of the bell-crank will cause the continuously-rotating drill-spindle 30 to be moved downward its limit and then return, which by the proper adjustment of the block on the support will cause a hole to be drilled to the proper depth through the electrotype and into the supporting-block. The next partial movement of the crank-disk will advance the crank-pin from the position of $a$, Fig. 8, to the position of $b$ and by reason of the pin striking a portion of the slot not concentric with its movement will move the carrier from its position as indicated in Fig. 7 to the position in which shown in Fig. 8. Now this throw of the crank-pin and the contour of the slot 26 are so arranged that the said movement of the carrier will be for a distance equal to the distance apart of the axis of the drill-spindle 30 and the axis of the bore 83 in the nail-retaining block. Hence, the electrotype and block being stationary on their support, the bore 83 of the nail-holder will be brought to the exact position just occupied by the drill, and it is now in order to feed a nail into the hole made by the drill in the block and drive it home. The further advancement of the crank disk and pin, that would bring the crank-pin from the position of $b$ to that of $c$, Fig. 8, will not move the carrier, because the portion of the irregular slot 26 is now concentric with the path of movement of the crank-pin; but when the crank-pin passes from the position of $a$ to that of $b$ it will be seen that its engagement with the slotted portion of the plate carrying the nail-driver 86 will cause the driver to descend a short distance, and the further movement from $b$ to $c$ will cause the driver to engage the nail in the retainer and also to open the retainer-block, thereby forcing the nail into the now registering hole in the electrotype and block and driving it home into the same. The fourth and last step in the revolution of the crank disk and pin moving the pin from the position of $c$ to that of $d$ will cause the pin to so engage the wall of the slot as to move the carrier back to its former position in which shown in Figs. 3 and 7. This last movement will also have the effect of withdrawing the driver-rod for half of its distance of movement vertically; but it will also be evident that during this last movement the cam 66 will strike the pin 64, connected with the nail-feeding device, and operate the latter to feed a nail through the guide-tube 74 down into the receiving-block, where it will be retained until the hammer next descends, as above described. It may be further stated that in the first step of the movement the arm 47 of the bell-crank will, through the bar 68, move the bar 65 and give additional movement to the nail-feeding block 57 should the former movement of the same not have been sufficient to cause a nail to be fed; but, as hereinbefore stated, this last operation is not necessary, provided the cam 66 is so constructed and arranged as to sufficiently operate the oscillating block 57.

From the above it will be apparent that during two steps of the operation, not consecutive, the carrier is moved and that during the alternating steps the drill and the nail-driver are operated respectively. It will further be apparent that the drill is moved downward and then withdrawn—that is, given a full reciprocation during the first step—so that the drill will be entirely out of the block before the second step shall have caused the carrier to move the drill bodily with respect to the block, and also that the nail-driving rod does head of the nail will be engaged at this part and arrested in its passage through the block until by suitable means the blocks are separated against the force of said spring 80, thereby so enlarging the bore that the nail may pass out. The nail that is retained in the said block is forced out of the same and into the aperture made by the said drill at the proper stage in the operation of the complete device by a reciprocating hammer or driver. The latter consists of a rod 86, secured in a bore in an arm 87, projecting forward from a reciprocating plate 88, that slides in a channel in the rear face of the carrier-plate 15, which plate is reciprocated by reason of the crank-pin 22 engaging the walls of a slot 89 in the plate. The lower end of the nail-driving rod 86 is made converging and of a size to engage the converging bore of the block at the proper time when its lower end shall have reached the head of a nail retained at said portion of the block. Thereupon the further downward movement of the driver will separate the movable members of the block, permitting the nail to pass downward, and at the same time the driver will follow the nail and force it into a drilled block on the support of the machine.

The operation of the several parts above described is as follows: With the crank-disk at rest and the crank-pin to the right, as shown in Fig. 3, it will be seen that the nail-driver is in an intermediate position and that it will be raised upon the crank-pin moving upward to the limit of its movement and will be depressed upon the crank-pin moving downward from said position to its lowermost position. Now suppose the crank-disk to be moved clockwise through ninety degrees, bringing the pin to its uppermost position. It will be evident from Fig. 3 that the nail-driver will move upward, while the bell-crank will be oscillated once by the engagement of the crank-pin with the arm 45. During this movement of the crank-pin it will be seen from Fig. 7 that the portion of the irregular slot 26 through which the pin moves is substantially concentric with the crank-disk. Hence the crank-pin will strike no abutment-face that would cause the carrier to be moved—that is, the carrier is stationary with respect to a block on the work-support. This rocking of the bell-crank will cause the continuously-rotating drill-spindle 30 to be moved downward its limit and then return, which by the proper adjustment of the block on the support will cause a hole to be drilled to the proper depth through the electrotype and into the supporting-block. The next partial movement of the crank-disk will advance the crank-pin from the position of $a$, Fig. 8, to the position of $b$ and by reason of the pin striking a portion of the slot not concentric with its movement will move the carrier from its position as indicated in Fig. 7 to the position in which shown in Fig. 8. Now this throw of the crank-pin and the contour of the slot 26 are so arranged that the said movement of the carrier will be for a distance equal to the distance apart of the axis of the drill-spindle 30 and the axis of the bore 83 in the nail-retaining block. Hence, the electrotype and block being stationary on their support, the bore 83 of the nail-holder will be brought to the exact position just occupied by the drill, and it is now in order to feed a nail into the hole made by the drill in the block and drive it home. The further advancement of the crank disk and pin, that would bring the crank-pin from the position of $b$ to that of $c$, Fig. 8, will not move the carrier, because the portion of the irregular slot 26 is now concentric with the path of movement of the crank-pin; but when the crank-pin passes from the position of $a$ to that of $b$ it will be seen that its engagement with the slotted portion of the plate carrying the nail-driver 86 will cause the driver to descend a short distance, and the further movement from $b$ to $c$ will cause the driver to engage the nail in the retainer and also to open the retainer-block, thereby forcing the nail into the now registering hole in the electrotype and block and driving it home into the same. The fourth and last step in the revolution of the crank disk and pin moving the pin from the position of $c$ to that of $d$ will cause the pin to so engage the wall of the slot as to move the carrier back to its former position in which shown in Figs. 3 and 7. This last movement will also have the effect of withdrawing the driver-rod for half of its distance of movement vertically; but it will also be evident that during this last movement the cam 66 will strike the pin 64, connected with the nail-feeding device, and operate the latter to feed a nail through the guide-tube 74 down into the receiving-block, where it will be retained until the hammer next descends, as above described. It may be further stated that in the first step of the movement the arm 47 of the bell-crank will, through the bar 68, move the bar 65 and give additional movement to the nail-feeding block 57 should the former movement of the same not have been sufficient to cause a nail to be fed; but, as hereinbefore stated, this last operation is not necessary, provided the cam 66 is so constructed and arranged as to sufficiently operate the oscillating block 57.

From the above it will be apparent that during two steps of the operation, not consecutive, the carrier is moved and that during the alternating steps the drill and the nail-driver are operated respectively. It will further be apparent that the drill is moved downward and then withdrawn—that is, given a full reciprocation during the first step—so that the drill will be entirely out of the block before the second step shall have caused the carrier to move the drill bodily with respect to the block, and also that the nail-driving rod does not enter to any appreciable distance into the hole in which the nail is driven home. At the same time it is advisable to provide a certain amount of lost motion at this portion of the operation, which is produced by the peculiar construction of the slot 26.

Having thus described my invention, I claim as new and desire to secure by Letters Patent—

1. A drilling and nailing machine, comprising a stationary work-support, a carrier above the same, a drill supported on the carrier, means for imparting a continuous rotary motion to the drill, a nail-driver also supported on the carrier, and means adapted to laterally reciprocate the carrier and alternately vertically reciprocate the drill at one end of the lateral reciprocation of the carrier and actuate the nail-driver at the other end.

2. In a drilling and nailing machine, the combination of a stationary work-support, a carrier above the same, a drill supported on the carrier, means for continuously rotating the drill, a nail-driver also supported by the carrier, a nail-feeding mechanism on said support adapted to separate one nail from the other and feed the separated nail to the nail-driver, and means adapted to laterally reciprocate the carrier so as to actuate the nail-feeding mechanism and alternately vertically reciprocate the drill at one end of the lateral reciprocation of the carrier and actuate the nail-driver at the other end.

3. In a drilling and nailing machine, the combination, with a stand and a support thereon, of a reciprocating carrier on said stand, a carrier-actuating means, a drill and a nail-driver on said carrier, means for rotating said drill, a nail-feeding device secured to said carrier and to said support, a bell-crank lever on said carrier operable by said carrier-actuating means for reciprocating said drill and operating said nail-feeding device, and means for actuating said nail-driver at the proper time.

4. In a nailing and drilling machine, the combination, with a stand and a support thereon, of a shaft journaled in said support, a crank-pin on said shaft, a carrier slidable on said stand and having an irregularly-shaped slot engaging said crank-pin for imparting a reciprocating movement to said carrier, a drill and a nail-driver on said carrier, means for continuously rotating said drill, and a nail feeding device secured to said carrier and to said support, said crank-pin being operable to reciprocate said drill and to operate said nail feeding device at one end of the reciprocating movement of said carrier, and to actuate said nail-driver at the other end of the same.

5. In a drilling and nailing machine, the combination with a stand and a support thereon, of a shaft carried by said support, a crank-pin on said shaft, a carrier slidable on said stand and having an irregularly-shaped slot engaging said crank-pin for imparting a reciprocating movement to said carrier, a drill on said carrier, means for continuously rotating said drill, a plate slidable on said carrier and provided with a slot engaging said crank-pin, a nail-driver on said plate, and a nail-feeding device secured to said carrier and to said support, said crank-pin being operable to reciprocate said drill and operate said nail feeding device at one end of the reciprocating movement of said carrier and to actuate said slidable plate and said nail-driver at the other end of the same.

In testimony that I claim the foregoing as my invention I have signed my name in presence of two subscribing witnesses.

JULIAN L. PERKINS.

Witnesses:
JAMES A. PERKINS,
CHARLES H. BARROWS.